United States Patent [19]
Felix

[11] Patent Number: 5,194,169
[45] Date of Patent: Mar. 16, 1993

[54] AZEOTROPE-LIKE REFRIGERANT MIXTURES OF 1,1-DICHLORO-2,2,2-TRIFLUOROETHANE AND 1,1-DICHLORO-1-FLUOROETHANE

[75] Inventor: Vinci M. Felix, Kennett Square, Pa.

[73] Assignee: E. I. Du Pont de Nemours and Company, Wilmington, Del.

[21] Appl. No.: 664,532

[22] Filed: Mar. 4, 1991

Related U.S. Application Data

[62] Division of Ser. No. 335,946, Apr. 10, 1989.

[51] Int. Cl.$^5$ ............................................. C09K 5/04
[52] U.S. Cl. ........................................ 252/67; 62/114; 252/172; 252/364; 252/DIG. 9
[58] Field of Search .............. 252/364, DIG. 9, 67, 252/172; 62/114

[56] References Cited

U.S. PATENT DOCUMENTS

| | | | |
|---|---|---|---|
| 3,214,397 | 10/1965 | Cox | 260/2.5 |
| 3,332,881 | 7/1967 | Burt et al. | 252/162 |
| 3,383,076 | 9/1974 | Moss et al. | 260/2.5 AQ |
| 4,076,644 | 2/1978 | Burt et al. | 252/182 |
| 4,531,951 | 7/1985 | Burt et al. | 55/23 |
| 4,615,822 | 10/1986 | Magnus | 252/182 |
| 4,758,605 | 7/1988 | Williams | 521/129 |
| 4,816,176 | 3/1959 | Lund et al. | 252/171 |
| 4,836,947 | 6/1989 | Lund et al. | 252/171 |
| 4,842,764 | 6/1987 | Lund et al. | 252/171 |
| 4,851,144 | 7/1989 | McGraw et al. | 252/67 |
| 4,863,630 | 9/1989 | Swan et al. | 252/171 |
| 4,894,176 | 1/1990 | Swan et al. | 252/171 |
| 4,927,863 | 5/1990 | Bartlett et al. | 521/133 |
| 4,957,652 | 9/1990 | Tamura et al. | 252/67 |

FOREIGN PATENT DOCUMENTS 1-103686 4/1959 Japan.

OTHER PUBLICATIONS

Asano et al., Chem. Abstract, 111 Abstract #176766(d) (1989).
Japanese Kokai No. 1-103686 (Abstract Only).
Japanese Kokai No. 1-138300 (Abstract Only).
Japanese Kokai No. 1-139861 (Abstract Only).
Research Disclosure 146, 13-14 (1976) 9E Chemical Abstract No. 86(23) 17076r.
Chemical Abstract CA111(8):58857m for Proc. SPI Annu. Tech/Mark. Conf., 31st pp. 159-163, 1988.
Chemical Abstract CA111(6):40525s 1988.
Chemical Abstract CA111(22):195983p from J. Therm Insul Jan. 12, 223-38 1989.

Primary Examiner—Edward A. Miller
Attorney, Agent, or Firm—James E. Shipley

[57] ABSTRACT

Azeotrope-like mixtures of 1,1-dichloro-2,2,2-trifluoroethane and 1,1-dichloro-1-fluoroethane, being useful as cleaning solvents, refrigerants and foam blowing agents.

2 Claims, No Drawings

AZEOTROPE-LIKE REFRIGERANT MIXTURES OF 1,1-DICHLORO-2,2,2-TRIFLUOROETHANE AND 1,1-DICHLORO-1-FLUOROETHANE

CROSS-REFERENCE TO RELATED APPLICATION

This application is a division of copending U.S. application Ser. No. 07/335,946 filed Apr. 10, 1989.

FIELD OF INVENTION

This invention relates to azeotrope-like mixtures of 1,1-dichloro-2,2,2-trifluoroethane (HCFC-123) and 1,1-dichloro-1-fluoroethane (HCFC-141b) and their use as cleaning solvents, refrigerants and blowing agents for thermoset polymer foams.

BACKGROUND OF THE INVENTION

Closed-cell polyurethane foams are widely used for insulation purposes in building construction and in the manufacture of energy efficient electrical appliances. In the construction industry, polyurethane (poly-isocyanurate) board stock is used in roofing and siding for its insulation and load-carrying capabilities. Poured and sprayed polyurethane foams are also used in construction. Sprayed polyurethane foams are widely used for insulating large structures such as storage tanks, etc. Pour-in-place polyurethane foams are used, for example, in appliances such as refrigerators and freezers plus they are used in making refrigerated trucks and railcars.

All of these various types of polyurethane foams require expansion agents (blowing agents) for their manufacture. Insulating foams depend on the use of halocarbon blowing agents, not only to foam the polymer, but primarily for their low vapor thermal conductivity, a very important characteristic for insulation value. Historically, polyurethane foams are made with CFC-11 as the primary blowing agent.

Another important type of insulating foam is phenolic foam. These foams, which have very attractive flammability characteristics, are generally made with CFC-11 and CFC-113 blowing agents.

As modern electronic circuit boards evolve toward increased circuit and component densities, thorough board cleaning after soldering becomes a more important criterion. Current industrial processes for soldering electronic components to circuit boards involve coating the entire circuit side of the board with flux and thereafter passing the flux-coated board over preheaters and through molten solder. The flux cleans the conductive metal parts and promotes solder fusion. Commonly used solder fluxes generally consist of rosin, either used alone or with activating additives, such as amine hydrochlorides and oxalic acid derivatives.

After soldering, which thermally degrades part of the rosin, the flux-residues are often removed from the circuit boards with an organic solvent. The requirements for such solvents are very stringent. Defluxing solvents should have the following characteristics: Have a low boiling point, be nonflammable, have low toxicity and have high solvency power, so that flux and flux-residues can be removed without damaging the substrate being cleaned.

While boiling point, flammability and solvent power characteristics can be adjusted by preparing solvent mixtures, these mixtures are often unsatisfactory because they fractionate to an undesirable degree during use. Such solvent mixtures also fractionate during solvent distillation, which makes it virtually impossible to recover a solvent mixture with the original composition.

On the other hand, azeotrope-like mixtures, with their essentially constant compositions, have been found to be very useful for these applications. Azeotrope-like mixtures, for all practical purposes, do not fractionate on evaporation or boiling. These characteristics are also important when using solvent compositions to remove solder fluxes and flux-residues from printed circuit boards. Preferential evaporation of the more volatile solvent mixture components would occur if the mixtures were not azeotrope-like. This could result in mixtures with changed compositions and less-desirable solvency properties, such as lower rosin flux solvency and lower inertness toward the electrical components being cleaned. This azeotrope-like character is also desirable in vapor degreasing operations, where redistilled solvent is generally employed for final rinse cleaning.

Many solvent compositions used industrially for cleaning electronic circuit boards and for general metal, plastic and glass cleaning are based upon CFC-113.

Refrigeration systems such as centrifugal chillers are used to cool water, food, etc. These systems presently may use CFC-11 as the refrigerant.

In the early 1970s, concern began to be expressed that the stratospheric ozone layer (which provides protection against penetration of the earth's atmosphere by ultraviolet radiation) was being depleted chlorine atoms introduced to the atmosphere from the release of fully halogenated chlorofluorocarbons. These chlorofluorocarbons are used as propellants in aerosols, as blowing agents for foams, as refrigerants and as cleaning/drying solvent systems. Because of the great chemical stability of fully halogenated chlorofluorocarbons, according to the ozone depletion theory, these compounds do not decompose in the earth's atmosphere but reach the stratosphere where they slowly degrade liberating chlorine atoms which in turn react with the ozone.

Concern reached such a level that in 1978 the U.S. Environmental Protection Agency (EPA) placed a ban on nonessential uses of fully halogenated chlorofluorocarbons as aerosol propellants. This ban resulted in a dramatic shift in the U.S. away from chlorofluorocarbon propellants (except for exempted uses) to primarily hydrocarbon propellants. However, since the rest of the world did not join the U.S. in this aerosol ban, the net result has been to shift the uses of chlorofluorocarbons in aerosols out of the U.S., but not to permanently reduce the world-wide total chlorofluorocarbon production, as sought. In fact, in the last few years the total amount of chlorofluorocarbons manufactured worldwide has exceeded the level produced in 1978 (before the U.S. ban).

During the period of 1978–1987, much research was conducted to study the ozone depletion theory. Because of the complexity of atmospheric chemistry, many questions relating to this theory remained unanswered. However, assuming the theory to be valid, the health risks which would result from depletion of the ozone layer are significant. This, coupled with the fact that world-wide production of chlorofluorocarbons has increased, has resulted in international efforts to reduce chlorofluorocarbon use. Particularly, in September, 1987, the United Nations through its Environment Programme (UNEP) issued a tentative proposal calling for a 50 percent reduction in world-wide production of fully halogenated chlorofluorocarbons by the year 1998. This proposal was ratified on Jan. 1, 1989, and it is scheduled to become effective on Jul. 1, 1989.

Because of this proposed reduction in availability of fully halogenated chlorofluorocarbons such as CFC-11, CFC-12 and CFC-113, alternative, more environmentally acceptable, products are urgently needed.

As early as the 1970s with the initial emergence of the ozone depletion theory, it was known that the introduction of hydrogen into previously fully halogenated chlorofluorocarbons markedly reduced the chemical stability of these compounds. Hence, these now destabilized compounds would be expected to degrade in the atmosphere and not reach the stratosphere and the ozone layer. The accompanying Table lists the ozone depletion potential for a variety of fully and partially halogenated halocarbons. Greenhouse potential data (potential for reflecting infrared radiation (heat) back to earth and thereby raising the earth's surface temperature) are also shown.

| OZONE DEPLETION AND GREENHOUSE POTENTIALS | | |
|---|---|---|
| Blowing Agent | Ozone Depletion Potential | Greenhouse Potential |
| CFC-11 (CFCl$_3$) | 1.0 | 0.4 |
| CFC-12 (CF$_2$Cl$_2$) | 1.0 | 1.0 |
| HCFC-22 (CHF$_2$Cl) | 0.05 | 0.07 |
| HCFC-123 (CF$_3$CHCl$_2$) | 0.02 | less than 0.1 |
| HCFC-124 (CF$_3$CHFCl) | 0.02 | less than 0.1 |
| HFC-134a (CF$_3$CH$_2$F) | 0 | less than 0.1 |
| HCFC-141b (CFCl$_2$CH$_3$) | 0.1 | less than 0.1 |
| HCFC-142b (CF$_2$ClCH$_3$) | 0.06 | less than 0.2 |
| HFC-152a (CHF$_2$CH$_3$) | 0 | less than 0.1 |
| CFC-113 (CF$_2$Cl—CFCl$_2$) | 0.8 | 0.3–0.8 |

Halocarbons such as HCFC-123, HCFC-123a and HCFC-141b are environmentally acceptable in that they theoretically have minimal effect on ozone depletion. (Although these values have not been calculated for HCFC-123a, it is estimated that they would be similar to those for HCFC-123.)

Unfortunately, as recognized in the art, it is not possible to predict the formation of azeotropes or azeotrope-like mixtures.

This fact obviously complicates the search for new azeotrope-like compositions, which have application in the field. Nevertheless, there is a constant effort in the art to discover new azeotrope-like compositions, which have desirable characteristics.

An objective of this invention is to provide ozone compatible novel azeotrope-like compositions based on 1,1-dichloro-2,2,2-trifluoroethane and 1,1-dichloro-1-fluoroethane which have good solvency power and other desirable properties for cleaning applications and are useful as foam blowing agents and as refrigerants.

Another object of the invention is to provide novel azeotrope-like solvents which are liquid at room temperature, will not fractionate under use-conditions and also have the foregoing advantages.

A further objective is to provide azeotrope-like compositions which are relatively nontoxic and nonflammable.

SUMMARY OF INVENTION

According to the present invention, azeotrope-like compositions have been discovered comprising mixtures of effective amounts of 1,1-dichloro-2,2,2-trifluoroethane (HCFC-123) and 1,1-dichloro-1-fluoroethane (HCFC-141b).

The azeotrope-like mixtures are blends of about 1–99 weight percent 1,1-dichloro-2,2,2-trifluoroethane and about 99–1 weight percent 1,1-dichloro-1-fluoroethane.

The present invention provides azeotrope-like compositions which are well suited for solvent cleaning, refrigeration and blowing agent applications.

Also included in the invention are processes for using the azeotrope-like compositions as cleaning agents, refrigerants and foam blowing agents.

DETAILED DESCRIPTION OF THE INVENTION

It has been discovered that liquid blends of HCFC-123 and HCFC-141b produce a vapor upon evaporation which has a composition which is substantially the same as the liquid. Blends of HCFC-123 and HCFC-141b have been observed to exhibit vapor pressures which unexpectedly deviate negatively from Raoult's Law predictions. This negative deviation indicates surprising association between these compounds and, it is believed that because of this association or bonding, blends of these compounds unexpectedly evaporate to essential dryness without showing significant fractionation. Furthermore, at greater than about 60–70 wt. % HCFC-141b in HCFC-123/HCFC-141b blends, the compositions of liquid and vapor phases become essentially identical. This lack of separation of HCFC-123/HCFC-141b is very important because HCFC-123 is nonflammable and HCFC-141b is flammable and it is necessary that nonflammable blends (containing at least about 35 wt. % HCFC-123) not fractionate and remain nonflammable on evaporation under conditions of a spill.

Further evidence of the unexpectedness or uniqueness of this lack of fractionation of HCFC-123/HCFC-141b blends under conditions of evaporation to dryness (e.g. under conditions of a blowing agent spill), can be gained from experiments in which HCFC-123/HCFC-141b blends are distilled in a column with an equal or greater-than 5 plate fractionation. Under these conditions, separation readily occurs, with HCFC-123 preferentially coming off, as would be predicted by Raoult's Law. Under conditions of a spill and evaporation, Raoult's Law would predict separation of HCFC-123 and HCFC-141b as evaporation approaches 100% in spite of their small boiling point difference (4° C.). This anticipated separation, under spill conditions, does not occur. The discovery that under "real-life" conditions of a spill followed by evaporation to dryness, the blends of HCFC-123/HCFC-141b show very little separation is unexpected and the object of this invention. In addition, this discovery is commercially very significant since it is important to avoid the presence of a volatile liquid or vapor which is flammable as a result of a spill.

The compositions of the invention comprise mixtures of 1,1-dichloro-2,2,2-trifluoroethane (boiling point 27.9° C.) and 1,1-dichloro-1-fluoroethane (boiling point 32.0° C.). These compounds are known as HCFC-123 and HCFC-141b, respectively. HCFC-123 may contain HCFC-123a, e.g., as much as 20 wt. % 1,2-dichloro-1,2,2-trifluoroethane (HCFC-123a).

By azeotrope-like composition or mixture is meant a mixture of two or more substances, which mixture has substantially the same composition in both its liquid and vapor phases. The vapor produced by partial evaporation of the liquid has substantially the same composition as the liquid, i.e., the mixture evaporates without substantial compositional change. Azeotrope-like compositions exhibit substantially constant compositions during evaporation as compared with that of nonazeotropic mixtures.

By effective amounts is meant as least some quantity of both HCFC-123 and HCFC-141b which, when combined, results in the formation of the azeotrope-like composition or mixture of the instant invention.

Two component mixtures of 1-99 weight percent 1,1-dichloro-2,2,2-trifluoroethane and 99-1 weight percent of 1,1-dichloro-1-fluoroethane are characterized as azeotrope-like mixtures, in that mixtures within this range exhibit a substantially constant composition during evaporation at atmospheric pressure. Being substantially azeotrope-like, the mixtures do not tend to fractionate to any great extent upon evaporation. After evaporation, only a small difference exists between the composition of the vapor and the composition of the initial liquid phase. This difference is such that the compositions of the vapor and liquid phases are considered substantially the same.

Accordingly, any mixture within the defined composition ranges exhibits properties which are characteristic of an azeotrope-like mixture.

The azeotrope-like mixtures of the instant invention boil at about 31.5° C., at substantially atmospheric pressure.

It has been found that azeotrope-like mixtures which contain a minimum of about 35-60 weight percent 1,1-dichloro-2,2,2-trifluoroethane are nonflammable as determined by specific flammability measurements shown in the Examples.

The preferred azeotrope-like mixture of the instant invention has the following composition: 30-70 weight percent 1,1-dichloro-2,2,2-trifluoroethane and 70-30 weight percent 1,1-dichloro-1-fluoroethane. The azeotrope-like mixture of this composition boils at about 31.5° C., at substantially atmospheric pressure.

The azeotrope-like mixtures of the present invention permit easy recovery and reuse of the solvent from vapor defluxing and degreasing operations because of their azeotrope-like characteristics. As an example, the azeotrope-like mixtures of this invention can be used in cleaning processes such as described in U.S. Pat. No. 3,881,949, which is incorporated herein by reference.

The azeotrope-like mixtures of the instant invention can be prepared by any convenient method including mixing or combining the desired component amounts. A preferred method is to weigh the desired component amounts and thereafter combine them in an appropriate container.

EXAMPLE 1

Evaporation studies were made on various blends of HCFC-123 and HCFC-141b, in which the samples were placed in a 500 ml flask equipped with a heater, magnetic stirrer and distillation head (with thermometer). This equipment provided esentially no fractionation. Samples were collected at evaporation intervals and analyzed for the amounts of HCFC-123 and HCFC-141b. The data are summarized in Table I.

TABLE I

| EVAPORATION TEST DATA | | |
|---|---|---|
| WT % LOST FROM FLASK | WT % 123 | WT % 141b |
| CONDENSATE ANALYSIS FOR NOMINAL BLEND OF | | |
| 20/80 123/141b | | |
| LIQUID IN FLASK AT START | 22.2 | 77.8 |
| 16.2 | 23.8 | 76.2 |
| 30.9 | 23.3 | 76.7 |
| 46.2 | 22.9 | 77.1 |
| 56.5 | 22.4 | 77.6 |
| 69.8 | 21.8 | 78.2 |
| 81.7 | 21.2 | 78.8 |
| 90.6 | 20.0 | 80.0 |
| 95.7 | 19.0 | 81.0 |
| 99.0 | 18.1 | 81.9 |
| LIQUID RESIDUE IN FLASK AT END | 16.6 | 83.4 |
| CONDENSATE ANALYSIS FOR NOMINAL BLEND OF | | |
| 40/60 123/141b | | |
| LIQUID IN FLASK AT START | 40.0 | 60.0 |
| 2.7 | 43.4 | 56.6 |
| 12.1 | 42.6 | 57.4 |
| 24.3 | 42.1 | 57.9 |
| 40.2 | 41.3 | 58.7 |
| 61.5 | 39.9 | 60.1 |
| 76.6 | 38.5 | 61.5 |
| 87.4 | 37.0 | 63.0 |
| 98.5 | 34.1 | 65.9 |
| LIQUID RESIDUE IN FLASK AT END | 29.9 | 70.1 |
| CONDENSATE ANALYSIS FOR NOMINAL BLEND OF | | |
| 50/50 123/141b | | |
| LIQUID IN FLASK AT START | 50.0 | 50.0 |
| 10.8 | 53.6 | 46.4 |
| 22.3 | 52.9 | 47.1 |
| 33.2 | 52.3 | 47.7 |
| 47.8 | 51.5 | 48.5 |
| 63.3 | 50.4 | 49.6 |
| 74.4 | 49.1 | 50.9 |
| 87.9 | 47.1 | 52.9 |
| 93.4 | 44.8 | 55.2 |
| 98.3 | 42.3 | 57.7 |
| LIQUID RESIDUE IN FLASK AT END | 38.9 | 61.1 |
| CONDENSATE ANALYSIS FOR NOMINAL BLEND OF | | |
| 60/40 123/141b | | |
| LIQUID IN FLASK AT START | 60.1 | 39.9 |
| 9.6 | 63.9 | 36.1 |
| 21.0 | 63.1 | 36.9 |
| 33.4 | 62.3 | 37.7 |
| 49.5 | 61.6 | 38.4 |
| 60.7 | 60.7 | 39.3 |
| 77.6 | 59.3 | 40.7 |
| 89.6 | 57.0 | 43.0 |
| 98.4 | 53.4 | 46.6 |
| LIQUID RESIDUE IN FLASK AT END | 48.9 | 51.1 |
| CONDENSATE ANALYSIS FOR NOMINAL BLEND OF | | |
| 65/35 123/141b | | |
| LIQUID IN FLASK AT START | 64.7 | 35.3 |
| 1.4 | 66.8 | 33.2 |
| 4.0 | 68.7 | 31.3 |
| 5.6 | 68.5 | 31.5 |
| 35.1 | 66.7 | 33.3 |
| 54.4 | 65.7 | 34.3 |
| 73.6 | 64.4 | 35.6 |
| 84.6 | 63.1 | 36.9 |
| 98.3 | 60.9 | 39.1 |
| LIQUID RESIDUE IN FLASK AT END | 53.7 | 46.3 |
| CONDENSATE ANALYSIS FOR NOMINAL BLEND OF | | |

TABLE I-continued

EVAPORATION TEST DATA

| WT % LOST FROM FLASK | WT % 123 | WT % 141b |
|---|---|---|
| | 80/20 123/141b | |
| LIQUID IN FLASK AT START | 81.2 | 18.8 |
| 17.5 | 83.5 | 16.5 |
| 33.4 | 82.9 | 17.1 |
| 50.6 | 82.3 | 17.7 |
| 67.4 | 81.4 | 18.6 |
| 85.2 | 80.1 | 19.9 |
| 95.7 | 78.0 | 22.1 |
| 98.8 | 74.8 | 25.2 |
| LIQUID RESIDUE IN FLASK AT END* | 68.4 | 31.6 |

*Composition of liquid residue was calculated.

EXAMPLE 2

Similar studies were made on various blends of HCFC-123 and HCFC-141b; however, in these tests, a distillation apparatus providing 5-plate fractionation was used. The data are summarized in Table II.

TABLE II

DISTILLATION TEST DATA
System: 5-Plate Still

| WT % LOST FROM FLASK | WT % 123 | WT % 141b |
|---|---|---|
| | CONDENSATE ANALYSIS FOR NOMINAL BLEND OF 20/80 123/141b | |
| LIQUID IN FLASK AT START | 20.0 | 80.0 |
| 7.9 | 24.2 | 75.8 |
| 15.3 | 23.5 | 76.5 |
| 24.5 | 22.7 | 77.3 |
| 33.4 | 22.7 | 77.3 |
| 43.7 | 21.8 | 78.2 |
| 51.1 | 21.1 | 78.9 |
| 59.2 | 22.4 | 77.6 |
| 66.9 | 19.2 | 80.8 |
| 75.7 | 17.1 | 82.9 |
| 83.4 | 15.6 | 84.4 |
| 91.7 | 13.3 | 86.7 |
| 97.6 | 10.7 | 89.3 |
| LIQUID RESIDUE IN FLASK AT END | 6.3 | 93.7 |
| | CONDENSATE ANALYSIS FOR NOMINAL BLEND OF 50/50 123/141b | |
| LIQUID IN FLASK AT START | 50.1 | 49.9 |
| 10.7 | 54.5 | 45.5 |
| 20.7 | 53.9 | 46.1 |
| 30.1 | 53.1 | 46.9 |
| 38.3 | 52.9 | 47.1 |
| 46.9 | 53.0 | 47.0 |
| 56.2 | 50.8 | 49.2 |

TABLE II-continued

DISTILLATION TEST DATA
System: 5-Plate Still

| WT % LOST FROM FLASK | WT % 123 | WT % 141b |
|---|---|---|
| 63.7 | 51.1 | 48.9 |
| 74.1 | 49.6 | 50.4 |
| 82.9 | 48.2 | 51.8 |
| 91.9 | 45.3 | 54.7 |
| 95.5 | 42.3 | 57.7 |
| LIQUID RESIDUE IN FLASK AT END | 34.8 | 65.2 |
| | CONDENSATE ANALYSIS FOR NOMINAL BLEND OF 80/20 123/141b | |
| LIQUID IN FLASK AT START | 80.0 | 20.0 |
| 11.8 | 90.4 | 9.6 |
| 23.1 | 88.8 | 11.2 |
| 33.1 | 87.2 | 12.8 |
| 43.6 | 85.9 | 14.1 |
| 53.7 | 83.5 | 16.5 |
| 62.7 | 81.4 | 18.6 |
| 73.7 | 77.6 | 23.4 |
| 83.3 | 76.4 | 23.6 |
| 93.8 | 70.1 | 29.9 |
| 96.5 | 63.1 | 36.9 |
| LIQUID RESIDUE IN FLASK AT END | 49.6 | 50.4 |

As can be seen from Examples 1 and 2, vapor composition upon evaporation remained substantially the same as the liquid composition; however, when the composition was distilled in a 5-plate distillation apparatus, the vapor composition changed.

EXAMPLE 3

The quantity of HCFC-123 required in the vapor space above blends of HCFC-123 and HCFC-141b for nonflammability was determined. The test conditions and results are summarized in Table III.

TABLE III

| NONFLAMMABLE BLEND OF HCFC-123/HCFC-141b | | |
|---|---|---|
| Ignition Source: | 3-mil copper exploding wire (110 volts) | |
| Temperature: | 80° C. | 150° C. |
| Quantity of HCFC-123 required for nonflammability* | greater than 36 wt. % | greater than 60 wt. % |

*In HCFC-123/HCFC-141b vapor mixtures in air.

EXAMPLE 4

Tests were conducted on HCFC-123, HCFC-141b and a 50/50 wt. percent blend of HCFC-123/HCFC-141b to determine their characteristics as foam blowing agents. Table IV shows the four polyurethane formulations used.

| Polyurethane System | Foam Application | POLYURETHANE SYSTEMS | | | | | |
|---|---|---|---|---|---|---|---|
| | | Isocyanate Index* | Polyol Type | Polyol Eq.Wt. | Isocyanate Type | Isocyanate Eq.Wt. | Comment |
| I | Appliance (pour-in place) | 105 | Polyether | 133.6 | MDI | 134.0 | Polyol contains 1.43% water |
| II | Appliance | 100** | Polyether | 118.0 | TDI (modified) | 124.0 | Polyol contains 0.85% water |
| III | Insulating | 250 | Polyester | 140.2 | MDI | 136.0 | No water |
| IV | Insulating board stock | 250 | Polyester | 197.0 | MDI | 136.5 | No water |

-continued

| Polyurethane System | Foam Application | Isocyanate Index* | Polyol Type | Polyol Eq.Wt. | Isocyanate Type | Isocyanate Eq.Wt. | Comment |
|---|---|---|---|---|---|---|---|
| | (isocyanurate) | | | | | | |

*The number of equivalents of isocyanates per equivalent of hydroxyl in the polyol multiplied by 100.
**Approximate The quantities of blowing agents used and the densities of the resultant foams are summarized in Table V.

TABLE V
POLYURETHANE FOAMS

| Polyurethane System* | Blowing Agent | Wt. % | Foam Density Lb./Cu.Ft. |
|---|---|---|---|
| I | HCFC-123 | 17.8 | 1.80 |
| I | HCFC-141b | 20.1 | 1.40 |
| I | HCFC-123/ HCFC-141b (1/1 blend) | 15.8 | 2.15 |
| II | HCFC-123 | 21.5 | 1.77 |
| II | HCFC-141b | 18.9 | 1.41 |
| II | HCFC-123/ HCFC-141b (1/1 blend) | 21.0 | 1.52 |
| III | HCFC-123 | 21.6 | 1.42 |
| III | HCFC-141b | 17.4 | 1.54 |
| III | HCFC-123/ HCFC-141b (1/1 blend) | 19.2 | 1.55 |
| IV | HCFC-123 | 14.8 | 2.66 |
| IV | HCFC-141b | 11.7 | 2.32 |
| IV | HCFC-123/ HCFC-141b (1/1 blend) | 13.5 | 2.42 |

*Each blowing agent system produced satisfactory low density, closed-cell foams.

The HCFC-123 used in this Example contained about 10–11 wt. % HCFC-123a. Tests were run with HCFC-123a on all four systems and the performance was similar to that for HCFC-123.

EXAMPLE 5

Cleaning tests were performed on single-sided circuit boards, ball bearings and nut/washer assemblies using 40/60 HCFC-123/HCFC-141b (1) and 40/60 HCFC-141b/HCFC-123 (2). The results are shown in Table VI.

TABLE VI
CLEANING TESTS

| Solvent | Substrate | Results |
|---|---|---|
| 1 | Single-sided circuit boards[a] | Boards cleaned with no visible residue |
| " | Nuts/washers assemblies[b] | Cleaned; no oil |
| " | Ball bearings[c] | Cleaned; no oil |
| 2 | Single-sided circuit boards | Boards cleaned with no visible residue |
| " | Nuts/washers assemblies | Cleaned; no oil |
| " | Ball bearings | Cleaned; no oil |

[a]Boards fluxed with activated rosin, preheated to 200° F., and soldered at 500° F. prior to cleaning.
[b]Assemblies dipped in Oak Drawing Oil No. 78-1 prior to cleaning.
[c]Bearings coated with Shell Alvania grease prior to cleaning.

EXAMPLE 6

Performance properties on HCFC-123, HCFC-141b and blends of these two compounds for a centrifugal water chiller were calculated. The coefficients of performance are shown in Table VII.

TABLE VII
REFRIGERANT COEFFICIENT OF PERFORMANCE DATA
System: Centrifugal Water Chiller

| Refrigerant | Wt. % | Coefficient of Performance |
|---|---|---|
| CFC-11 | 100 | 7.63 |
| HCFC-123 | 100 | 7.40 |
| HCFC-141b | 100 | 7.65 |
| HCFC-123/ HCFC-141b | 60/40 | 7.48 |
| HCFC-123/ HCFC-141b | 80/20 | 7.45 |

EXAMPLE 7

A simple laboratory boil-off experiment was conducted in a one-plate laboratory distillation apparatus to determine what effect solvent make-up had on solvent composition in a boiling flask. This experiment was conducted using a 40/60 blend of HCFC-141b/HCFC-123. Initial and make-up compositions were identical, with the composition as shown for 0 percent boil-off in Table VIII. Complete test results are shown in Table VIII.

TABLE VIII

| Percent Boil-off | Temp. °C. | Flask Residue Composition, wt. % HCFC-141b | HCFC-123 |
|---|---|---|---|
| 0 | 31.1 | 40.1 | 59.9 |
| 20 | 30.9 | 41.4 | 58.6 |
| 40 | 31.0 | 40.2 | 59.8 |
| 50 | 31.0 | 41.6 | 58.4 |
| Refilled Flask to 0 percent boil-off level. | | | |
| 20 | 31.0 | 41.3 | 58.7 |
| 40 | 31.1 | 41.7 | 58.3 |
| 50 | 31.1 | 40.6 | 59.4 |
| Refilled Flask to 0 percent boil-off level. | | | |
| 20 | 31.1 | 39.9 | 60.1 |
| 40 | 31.1 | 40.1 | 59.9 |
| 60 | 31.0 | 40.7 | 59.3 |
| 80 | 31.0 | 44.3 | 55.7 |
| 90 | 31.0 | 45.2 | 54.8 |
| 95 | 31.0 | 46.4 | 53.6 |

The data in Table VIII show that the mixture composition did not change substantially with up to fifty percent of the initial charge boiled off. The boiling temperature remained substantially constant throughout the experiment.

EXAMPLE 8

A simple laboratory boil-off experiment was conducted in a one-plate laboratory distillation apparatus to determine what effect solvent make-up had on solvent composition in a boiling flask. This experiment was conducted using a 60/40 blend of HCFC-141b/HCFC-123. Initial and make-up compositions were identical, with the composition as shown for 0 percent boil-off in Table IX. Complete test results are shown in Table IX.

TABLE IX

| Percent Boil-off | Temp. °C. | HCFC-141b | HCFC-123 |
| --- | --- | --- | --- |
| 0 | 31.5 | 59.9 | 40.1 |
| 20 | 31.5 | 60.7 | 39.3 |
| 40 | 31.5 | 61.0 | 39.0 |
| 50 | 31.5 | 61.2 | 38.8 |
| Refilled Flask to 0 percent boil-off level. | | | |
| 20 | 31.5 | 60.9 | 39.1 |
| 40 | 31.5 | 61.3 | 38.7 |
| 50 | 31.5 | 61.8 | 38.2 |
| Refilled Flask to 0 percent boil-off level. | | | |
| 20 | 31.5 | 59.1 | 40.9 |
| 40 | 31.5 | 59.7 | 40.3 |
| 60 | 31.6 | 60.5 | 39.5 |
| 80 | 31.6 | 62.5 | 37.5 |
| 90 | 31.7 | 63.3 | 36.7 |
| 95 | 31.8 | 63.7 | 36.3 |

The data in Table IX show that neither the mixture composition nor boiling temperature changed substantially with up to fifty percent of the initial charge boiled off.

We claim:

1. A process for heating or cooling comprising the use of an azeotrope-like composition consisting essentially of effective amounts of 1,1-dichloro-2,2,2-trifluoroethane and 1,1-dichloro-1-fluoroethane as a refrigerant.

2. The process of claim 1 wherein the azeotrope-like composition is about 80–20 weight percent 1,1-dichloro-2,2,2-trifluoroethane and about 20–80 weight percent 1,1-dichloro-1-fluoroethane having a boiling point of about 31.5° C. at substantially atmospheric pressure.

* * * * *